United States Patent Office 2,898,962
Patented Aug. 11, 1959

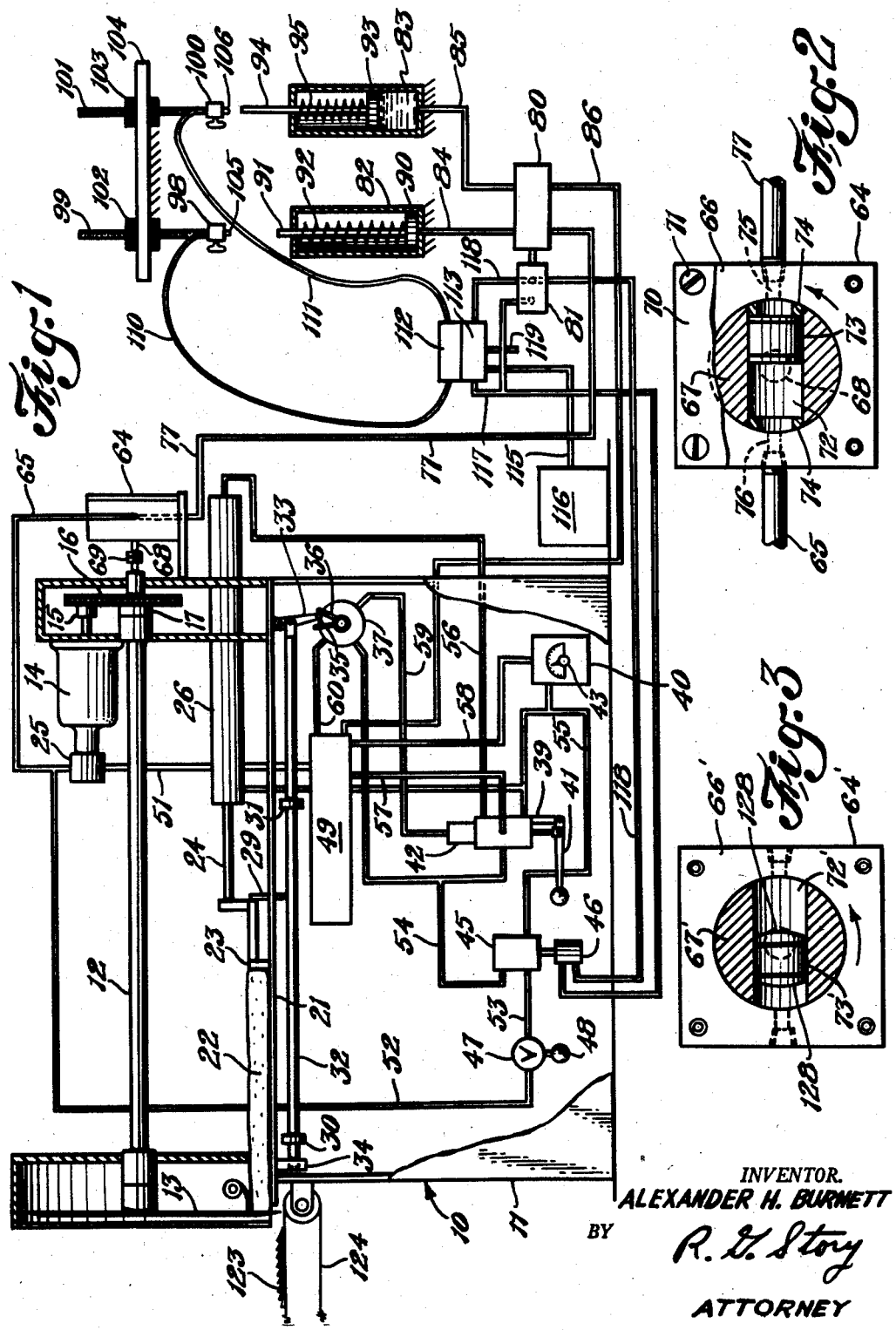

2,898,962

MEAT SLICING MACHINE CONTROL APPARATUS

Alexander H. Burnett, Chicago, Ill., assignor to Swift & Company, Chicago, Ill., a corporation of Illinois Application March 25, 1957, Serial No. 648,159

9 Claims. (Cl. 146—94)

The present invention relates to an apparatus for controlling the number of slices in a group cut from a block of food product, such as a slab of bacon, by a slicing machine, and the interval between the groups of slices.

For many years it has been the practice in the manufacture of bacon to cut slices of the bacon from a slab by means of a rotating knife. These slices were deposited as they were cut onto a moving conveyor with the slices being in overlapping relationship, a process commonly termed "shingling." Various methods and apparatus have been devised and some of them used to separate the slices coming from the slicing machine into groups. For example, one of the common efforts has been to move the takeaway conveyor or portions thereof at different speeds at different times in order to fix the number of slices in a group and to achieve a separation between groups of slices. Because of the rapidity at which the rotating knife cuts the slices from the slab of bacon, this has been difficult to achieve within the time available between the cutting of one slice and the cutting of the next slice. Another effort has been to stop the movement of the slab to the knife for an interval. The present invention relates to an apparatus of this latter type but has a substantial advantage over the prior art devices in that the number of slices to be included in a group readily may be adjusted independently of any adjustment of the space between two groups or, conversely, the space between the groups readily may be adjusted independently of any adjustment of the number of slices in a group.

One of the principal objects of the present invention is to produce such an apparatus which is dependable and which will keep operating relatively indefinitely without any unreasonable servicing problems. Obviously any apparatus of this type for handling food must be kept clean in order not to contaminate the food. As a matter of fact, in those plants handling product which will be sold in interstate commerce, representatives of the Department of Agriculture constantly supervise all equipment to make sure that this is done. Bacon, of course, includes substantial quantities of fat which smears the equipment. Such fat deposits must be removed at least daily. Steam and/or extremely hot water, which is used in the course of the cleaning of the bacon slicing equipment, will foul electrical equipment in a period of time unless extreme precautions are taken. The present invention incorporates wholly hydraulic controls, and thereby avoids the aforementioned problem encountered with prior art devices using electrical controls.

Another object and advantage of the present invention is the positive stopping of the feed of the bacon slab to the knife during the interval provided for the spacing of groups of slices. There is no tendency of the feed apparatus to creep forward and thus continue to push the slab slightly into the knife, causing wasted slivers of product to be cut from the block of product.

Incorporated in the control apparatus is a novel pump that I have devised for counting the number of slices and the interval between the slices. While this pump may have other uses, it is particularly advantageous in this particular apparatus. Not only does it very accurately measure amounts of fluid but it is substantially trouble-free. Used with the oil of hydraulic systems it is self-lubricating.

Further objects and advantages will become apparent from the following description taken in conjunction with the drawings, in which:

Figure 1 is a schematic illustration of my invention;

Figure 2 is an end view of the measuring pump with a portion of the cover broken away and the pump rotor in section; and Figure 3 is an end view, in section, of an alternative form of pump.

In Figure 1 a bacon slicing machine, generally 10, is illustrated schematically in a side view. Various types of such machines are on the market and are known to the prior art, for example see Patents Nos. 2,642,910 and 2,744,553. The slicer 10 includes a frame 11 in which a rotary shaft 12 is suitably journaled. Attached to one end of shaft 12 is a rotary knife 13. Such a knife is not circular when seen from the end but has a knife edge of a spiral configuration to perform the cutting action. The knife is driven by a suitable power source such as motor 14, which is connected to shaft 12 through a sprocket 15 on the motor shaft, a chain 16 and a sprocket 17 on the shaft 12.

Below shaft 12 is a plate 21 which forms a conveying surface for a slab of bacon 22. A pusher 23 attached to piston rod 24 is employed to move the slab 22 towards knife 13. The motive power is a pump 25 driven by motor 14 which supplies hydraulic fluid under pressure to the hydraulic cylinder 26 of which piston rod 24 is a part.

Attached to pusher 23 is a finger 29 which moves between two stops 30 and 31 on a sliding rod 32. At the right end, rod 32 is pivotally attached to a pinned arm 33, in turn pivotally mounted on frame 11. At the other end rod 32 slides in a bearing 34. Arm 33 has a finger 35 at the bottom end thereof, which finger is received in a V-shaped actuating member 36 of rotary valve 37.

Used in conjunction with valve 37 to control the direction and speed of movement of pusher 23 is a valve 39 and a calibrated throttling, or flow-control, valve 40. Valve 39 is a 3-position valve spring-loaded so that it normally is in the center position. Valve 39 has a manual actuating handle 41 which may be moved either side of center to set the valve in one or the other of the two positions other than the normal center position. Valve 39 also has at one end a hydraulic cylinder 42 which when fluid pressure is applied to it will move the setting of the valve from the neutral, center, position to one of the two remaining positions. Of course, when the fluid pressure is relieved from cylinder 42, the internal springs of valve 39 will return it to the center position of neutral. Valve 39 and the remaining portions of the slicer thus far described are components of a conventional slicer.

Also employed is a valve 45 operated by a hydraulic cylinder 46 and a valve 47 having a manual operating lever 48. A tank 49 is employed as a reservoir for the hydraulic fluid.

A pipe 51 connects pump 25 with reservoir 49 and serves as the intake line for pump 25. The hydraulic fluid under pressure from pump 25 is delivered to valve 47 by a pipe 52. From valve 47 the hydraulic fluid goes to valve 45 through a pipe 53 connecting the latter two valves. With one setting of valve 45 the hydraulic fluid under pressure is delivered from pipe 53 to a pipe 54 which connects to valve 39 and to valve 37.

With the other setting of valve 45 the oil under pressure is delivered from pipe 53 to pipe 55 which connects to flow-control valve 40, to valve 39, and to one end of hydraulic cylinder 26. The other end of hydraulic cylinder 26 is connected to valve 39 by a pipe 56. Two additional pipes 57 and 58, respectively, connect to reservoir 49 and to valves 39 and 40, respectively. A pipe 59 connects valve 37 with cylinder 42 of valve 39. A pipe 60 connects valve 37 to reservoir 49.

A metering pump 64 is connected to pump 25 by a pipe 65. The structure of pump 64 is best illustrated by reference to Figure 2. It will be seen that the pump 64 includes a body member 66 having a central opening therein within which is received a rotor 67. In Figure 2 the rearward side of the opening of body member 66, in which opening rotor 67 is received, is closed except for an opening in the body member 66 through which a shaft 68 attached to rotor 67 projects. Referring back to Figure 1 it will be seen that shaft 68 is connected to shaft 12 through a coupling 69. The opposite end of the opening in body 66, in which opening rotor 67 is received, is closed by a cover plate 70 held in place by screws 71.

Transverse to the cylindrical axis of rotor 67 is an opening in rotor 67 forming a cylinder 72. In cylinder 72 is a piston 73. After the piston was inserted into cylinder 72 a stop 74 was inserted into each end of cylinder 72 and attached to rotor 67. At opposite sides of the body 66 are pasageways 75 and 76 threaded to receive pipes 77 and 65, respectively.

Pipe 77 connects pump 64 with a four-way valve 80 operated by an air cylinder 81. Valve 80 determines whether the oil is fed to a first measuring cylinder 82 or to a second measuring cylinder 83 through pipes 84 and 85, respectively. The oil discharge from valve 80 is through a pipe 86 to tank 49.

Measuring cylinder 82 incorporates within the cylinder a piston 90 having a piston rod 91 extending through the wall of the cylinder. A spring 92 within the cylinder about piston rod 91 urges the piston 90 towards the end of the cylinder 92 with which pipe 84 communicates. Similarly cylinder 83 has a piston 93, a piston rod 94 and a spring 95.

Positioned in alignment with piston rod 91 is an air valve 98 supported on a threaded rod 99. A valve 100 is similarly mounted on a rod 101. Rods 99 and 101 are threaded into knurled adjusting wheels 102 and 103, respectively, rotatably supported by a plate 104. By turning wheels 102 and 103 rods 99 and 101, respectively, are moved longitudinally so as to vary the distance between the operating members 105 and 106 of valves 98 and 100, respectively, and the ends of piston rods 91 and 94, respectively. Air valves 98 and 100 have internal springs urging the valves to the closed position. When operating members 105 and 106 are pressed, the respective valves are opened so as to discharge air into the atmosphere.

Valves 98 and 100 are connected by means of hoses 110 and 111 to a valve controller 112 which operates an air valve 113. Valve controller 112, valve 113, and the actuating valves 98 and 100 are a standard unit manufactured by Mead Specialties Company, Chicago, Illinois, and sold under their designation "Meadmatic 4-way Valve, model #402." Valve 113 is a slide valve having an internal cavity to which air under pressure is delivered by a pipe 115 from an air compressor 116. A slide within the cavity will uncover a port leading to pipe 117 or a port leading to pipe 118, depending upon the position of the valve. The port that is not uncovered is placed in communication with an exhaust port leading to exhaust pipe 119. The slide connects to the side of a piston within a cylinder in valve operator 112. Hose 110 communicates with one end of the cylinder, while hose 111 communicates with the opposite end of the cylinder. Small bleeder passageways communicate through the piston between each end of the cylinder and the pressurized internal area of valve 113. Pipe 118 connects to one end of air cylinder 81 and to one end of air cylinder 46. Similarly, pipe 117 connects to the opposite end of air cylinder 81 and to the opposite end of air cylinder 46.

In operation the motor 14 rotates pump 25 to supply hydraulic fluid to pipes 52 and 65. Motor 14 also rotates knife 13 and metering pump 64. Assuming that the machine is set up in the position illustrated in Figure 1, the oil under pressure from pipe 52 passes through valve 47, pipe 53, valve 45, pipe 54, valve 39, pipe 56 to the right end of cylinder 26 so as to move the slab 22 towards knife 13. The setting of valve 37 blocks the end of the pipe 54 in that valve and also opens pipe 59 into pipe 60 so that fluid cylinder 42 will be relaxed. Fluid from the left end of cylinder 26 passes through pipe 55 to flow-control valve 40. Pipe 55 at valve 39 and at valve 45 is blocked. The rate of flow of the fluid through valve 40 into pipe 58 and tank 49 controls the thickness of the slices. An adjusting handle 43 on valve 40 is used to set the rate of flow and is suitably calibrated.

With each 180° rotation of shaft 12, the rotor 67 of pump 64 similarly rotates 180°. Assume that the rotor 67 starts at the position illustrated in Figure 2. The left end of cylinder 72 is full of oil from pump 25 while the right end of the cylinder 72 has been emptied (except for the small amount of oil within the central opening in stop 74). When the rotor 67 rotates 180° the oil-filled end of cylinder 72 is placed in communication with pipe 77, while the empty end comes into communication with pipe 65. The oil under pressure from pump 25 moves piston 73 towards the opposite end of the cylinder (that is, from left to right in Figure 2), filling the left end of the cylinder 72 with oil and emptying the right end of the cylinder into pipe 77. Thus with each 180° rotation of rotor 67 a measured quantity of oil, that is, the quantity of oil necessary to move piston 73 from one of stops 74 to the other of stops 74, will be discharged into pipe 77.

These measured quantities of oil from pipe 77 are delivered to four-way valve 80 where the oil will pass through pipe 85 into cylinder 83. The oil moves piston 93 against the resistance of spring 95 to raise piston rod 94 towards operator 106 of valve 100. After a predetermined number of quantities of oil from pump 64 are introduced into cylinder 83, piston rod 94 will actuate operator 106 of valve 100. The number of individual quantities of oil necessary to cause the contact of piston rod 94 with operator 106 can be controlled by rotating the knurled setting 103 to raise or lower threaded rod 101.

When piston rod 94 opens valve 100 by pushing against operator 106, the air that has bled into the right end of the cylinder of operator 112 is released, whereupon the air under pressure in the left end of the cylinder pushes the piston in the cylinder of operator 112 to the right, moving the slide of valve 113. The movement of the slide of valve 113 discharges pipe 118 through exhaust 119 and places air under pressure from pipe 115 into line 117 to reposition air cylinders 81 and 46 of valves 80 and 45, respectively.

The repositioning of air cylinder 81 actuates valve 80 to discharge the fluid in cylinder 83 through pipe 86, back to tank 49. At the same time it places pipe 84 of cylinder 82 into communication with pipe 77 so as to receive the quantities of oil from measuring pump 64. Also at the same time air cylinder 46 operates valve 45 to cut off the fluid supply from pipe 53 to pipe 54 and to place that fluid supply in communication with pipe 55. Shutting off the suppply of fluid to pipe 54 obviously shuts off the supply of fluid to the right end of cylinder 26 (which communication was previously described through valve 39). To effect a positive stopping of the piston and piston rod 24 of cylinder 26 the oil under pressure through pipe 55 is applied to the left end of cylinder 26. A small amount of this oil bleeds off through flow-control valve 40 but there is an adequate amount of oil available to prevent any creeping of the piston and piston rod 24 of cylinder 26 to the left under any residual pressure that may be left in pipes 54 and 56.

Thus, the actuation of valve 100 stopped the counting or measuring that was being performed by cylinder 83, commenced the measuring by cylinder 82, and stopped the movement of the slab 22 into knife 13. One group 123 of slices now has been formed on discharge conveyor 124.

The flow of fluid from cylinder 83 permits the piston 93 and piston rod 94 to move away from valve 100 under the urging of spring 95, the oil being returned to tank 49. The closing of valve 100 as piston rod 94 moves away from operator 106 permits the air to again equalize both sides of the piston in operator 112, but the mere equalization of the pressure will obviously not cause any movement of the piston.

The quantities of oil from pump 64 are now going through pipe 77, valve 80, pipe 84 into measuring cylinder 82. This oil raises piston 90 and piston rod 91. After a given number of quantities of oil from measuring pump 64, piston rod 91 contacts operator 105 of valve 98 and opens that valve to atmosphere. The air being discharged from the left end of the cylinder in operator 112 allows the air under pressure in the right end of that cylinder to move the piston in the cylinder to the left and change the position of valve 113. The number of quantities of oil required to actuate valve 98 is determined by the setting of threaded rod 99. This can be changed by turning the adjusting member 102.

With the resetting of valve 113, pipe 117, is discharged to atmosphere through exhaust 119, while pipe 118 is supplied with air under pressure from compressor 116 to reposition air cylinder 81 and air cylinder 46. Air cylinder 81 changes the position of four-way valve 80 to discharge cylinder 82 through pipe 84, valve 80, and pipe 86, to tank 49. At the same time pipe 85 is placed in communication with pipe 77 so as to allow measuring cylinder 83 to commence filling with the subsequent impulses of oil. The repositioning of air cylinder 46 operates valve 45 to close off pipe 55 and open pipe 54 to the fluid under pressure from pipe 53. This again applies the fluid to the right hand end of cylinder 26 to commence moving the slab 22 towards knife 13. Having kept pipe 55 full by the fluid under pressure from pipe 53 before the last operation of valve 45, the flow through throttling valve 40 will remain the same so that there will be no sudden jump of pusher 23 to the left because of lowered pressure in pipe 55.

From the foregoing it will be seen that cylinder 83 counts out, or measures out, a number of predetermined quantities of oil before stopping the movement of slab 22. These quantities of oil determine the number of slices that will make up a group 123. The usual practice is to have knife 13 so contoured that it cuts one slice for each rotation of shaft 12. Each rotation of shaft 12 actually injects two impulses of oil from measuring pump 64 (one impulse for each 180° of rotation). The operator 106 of valve 100 is set so that it will be actuated at a point that will correspond to the number of slices desired. The space between the groups of slices is determined by the measurement by measuring cylinder 82. During this measuring period the knife 13 is rotating without cutting any slices. Conveyor 124 is continuing to move so that the group 123 is conveyed away. Since conveyor 124 and knife 13 are moving at constant speeds, the number of rotations of shaft 12 to produce a given number of impulses of oil from pump 64 sufficient to actuate valve 98 will determine the space between the groups of slices. Again this space may be varied by moving valve 98 up and down through the rotation of wheel 102.

If the slab 22 is moved all the way to the left without the operator having taken the time to insert a new slab at the end of pusher 23, the depending finger 29 will contact stop 30 and move rod 32 to the left, thus rotating the V-shaped operating member 36 of valve 37 counterclockwise to open pipe 54 into pipe 59. The fluid under pressure from pipe 54 is applied to cylinder 42 of valve 39 through pipe 59 to move the valve the same direction that would be achieved by moving valve handle 41 down. This shuts off the communication between pipe 54 and pipe 56 through valve 39 and places pipe 53 in communication with pipe 55. At the same time pipe 56 is placed in communication with pipe 57. Thus, oil under pressure is applied through pipe 55 to the left end of cylinder 26 while the right end of cylinder 26 is discharged to tank 49 through pipe 56, valve 39, and pipe 57. (A small amount of oil will pass through throttling valve 40, but pump 25 is more than adequate to overcome this loss.)

The oil under pressure in the left end of cylinder 26 with the right end being discharged to the tank permits the rapid return of the piston, piston rod 24 and pusher 23 to the right in Figure 1. Since there is no throttling of the oil either that being fed to cylinder 26 or that being discharged from cylinder 26, the return movement is relatively rapid. Upon completing the return movement, finger 29 strikes stop 31 on rod 32 to rotate the V-shaped operating member 36 clockwise in Figure 1, and reposition valve 37. This cuts off the flow of fluid from pipe 54 to pipe 59 and allows the discharge of fluid from pipe 59 through valve 37 into pipe 60 and tank 49. With the release of the fluid in cylinder 42 the springs in valve 39 return it to the central, neutral, position, at which position pipe 54 feeds hydraulic fluid to pipe 56 and the right end of cylinder 26.

Presumably, in the meantime, the operator will have placed a new slab on plate 21 ahead of pusher 23. In order to move this slab rapidly up to the position where knife 13 will commence cutting the slab, the handle 41 may be raised. In the raised position, pipe 54 remains in communication with pipe 56 to feed oil to the righthand end of cylinder 26. At the same time, however, pipe 55 is placed in communication with pipe 57 and tank 49 through valve 39. This bypasses the throttling valve 40 so that the pusher 23 is permitted to move rapidly to the left in Figure 1. When the slab gets to the point that knife 13 commences cutting slices from the slab, the operator releases handle 41 to allow the springs in valve 39 to center the valve again which results in the normal feeding of the slab 22 to knife 13 as previously described.

At any time during the operation when slab 22 has been sufficiently consumed to provide space for the insertion of another slab were pusher 23 to be retracted, the operator may move handle 41 down which will position valve 39 the same as if cylinder 42 had been supplied with oil, as previously described, to cause a rapid return of pusher 23 to the right. The operator then drops a slab in place on plate 21, raises handle 41 above the center position so as to move pusher 23 rapidly to the left to a point at which knife 13 again commences cutting slices from the slab.

The description of a specific embodiment is for the purpose of complying with 35 U.S.C. 112, and should not be construed as imposing unnecessary limitations on the appended claims inasmuch as variations thereof will be apparent to those skilled in the art and such variations are deemed to be within the scope of the invention to the extent that the appended claims do not specifically eliminate such variations. For example, instead of employing stops 74 in the pump of Figure 2, the ends of the piston 73 can be rounded preferably to the same curvature as that of the cylindrical opening in body 66. Such a variation is illustrated in Figure 3 wherein the body member 66' and rotor 67' correspond to the parts described with respect to Figure 2. As in Figure 2, rotor 67' has a central opening therein 72'. However, there are no stops at each end of the cylindrical opening. Instead the piston 73' has dome shaped ends 128. This embodiment is advantageous to use when pump 64 is employed in a setting wherein the pressure from pipe 77 is likely to drop off. In such a case in the embodiment of Figure 2 the amount of oil within the internal opening of stop 74 as that stop came into communication with pipe 77 could vary from the opening being full to the opening being something less than full of oil with the result that the embodiment of Figure 2 would be erratic in the measurement of quantities of oil. However, an embodiment such as that illustrated in Figure 3 would remain accurate in its measurement of the quantities of oil.

I claim:

1. A bacon slicing machine comprising a knife moving in a given plane; a conveyor including a hydraulic power means for advancing a slab of product toward said plane; and a control apparatus for said power means including a hydraulic pump to produce a given quantity of fluid for each rotation of said knife, and measuring means associated with said pump to alternately first count a predetermined number of said quantities and then a given number of said quantities; said measuring means being adjustable to permit said predetermined number and said given number to be independently varied; said measuring means being connected to said power means to advance said slab toward said knife during the rotations for which the quantities of fluid are produced for said predetermined number count to be made and to stop said slab for the rotations for which the quantities of fluid are produced for said given number count to be made.

2. A bacon slicing machine comprising a knife moving in a given plane; a conveyor including a hydraulic cylinder means for advancing a slab of product toward said plane; and a control apparatus for said power means including a hydraulic pump to produce a given quantity of fluid for each rotation of said knife, and measuring means associated with said pump to alternately first count a predetermined number of said quantities and then a given number of said quantities; said measuring means being connected to said power means to apply pressure to an end of the cylinder to advance said slab toward said knife during the rotations for which the quantities of fluid are produced for said predetermined number count to be made, and to disconnect said pressure at the end of those rotations and apply a balancing pressure to the other end of the cylinder during the following rotations for which the quantities of fluid are produced for said given number count to be made.

3. A bacon slicing machine comprising a rotary knife moving in a given plane; a conveyor including a hydraulic power means for advancing a slab of product toward said plane; and a control apparatus for said power means including a pump to produce a given quantity of fluid for each rotation of said knife, said pump comprising a rotor formed about a cylindrical axis mounted in a cylindrical cavity in a body member for rotation about said axis, said rotor having an opening therethrough transverse to said axis forming a pumping cylinder, a piston in said pumping cylinder, said body member having a pair of passageways therein communicating with said opening on opposite sides of said opening and in alignment with said cylinder at a position in the path of rotation of said cylinder, a source of fluid under pressure connected to one of said passageways, a first measuring means to count a predetermined number of said quantities, a second measuring means to count a given number of said quantities, and sequencing means to alternately connect the other passageway of said pump to said first measuring means until the first means counts said predetermined number of quantities and to said second measuring means until said second means counts said given number of quantities; said control apparatus being connected to said power means to advance said slab toward said knife when said count of said predetermined number is being made and to stop said slab when said count of said given number is being made.

4. A control apparatus for a bacon slicing machine or the like having a rotary knife and hydraulic power means for advancing a slab of bacon or the like into said knife, said apparatus comprising a hydraulic pump to produce a given quantity of fluid for each rotation of said knife, and measuring means associated with said pump to alternately first count a predetermined number of said quantities and then a given number of said quantities, said measuring means being adjustable to permit said predetermined number and said given number to be independently varied, said measuring means being connected to said power means to advance said slab toward said knife during the rotations for which the quantities of fluid are produced for said predetermined number count to be made and to stop said slab for the rotations for which the quantities of fluid are produced for said given number count to be made.

5. Control apparatus for a bacon slicing machine or the like having a rotary knife, a hydraulic cylinder, and hydraulic power means for operating said cylinder and advancing a slab of bacon to said knife, said apparatus comprising a hydraulic pump to produce a given quantity of fluid for each rotation of said knife, and measuring means associated with said pump to alternately first count a predetermined number of said quantities and then a given number of said quantities, said measuring means being connected to said power means to apply pressure to an end of the cylinder to advance said slab toward said knife during the rotations for which the quantities of fluid are produced for said predetermined number count to be made, and to disconnect said pressure at the end of those rotations and apply a balancing pressure to the other end of the cylinder during the following rotations for which the quantities of fluid are produced for said given number count to be made.

6. Control apparatus for a bacon slicing machine or the like having a rotary knife, a hydraulic cylinder, and hydraulic power means for operating said cylinder and advancing a slab of bacon to said knife, said apparatus comprising a hydraulic pump to produce a given quantity of fluid for each rotation of said knife, and measuring means associated with said pump to alternately first count a predetermined number of said quantities and then a given number of said quantities, said measuring means being adjustable to permit said predetermined number and said given number to be independently varied, said measuring means being connected to said power means to apply pressure to an end of the cylinder to advance said slab toward said knife during the rotations for which the quantities of fluid are produced for said predetermined number count to be made, and to disconnect said pressure at the end of those rotations and apply a balancing pressure to the other end of the cylinder during the following rotations for which the quantities of fluid are produced for said given number count to be made.

7. A control apparatus for a bacon slicing machine or the like having a rotary knife and hydraulic power apparatus for advancing a slab of bacon or the like into said knife, said control apparatus comprising a hydraulic pump to produce a given quantity of fluid for each rotation of said knife, a first measuring means to count a predetermined number of said quantities, a second measuring means to count a given number of said quantities, sequencing means connected between said pump and said measuring means to alternately connect said pump to said first measuring means until the first means counts said predetermined number of quantities and to said second measuring means until said second means counts said given number of quantities, said measuring means being connected to said power apparatus to advance said slab toward said knife when said count of said predetermined number is being made and to stop said slab when said count of said given number is being made.

8. A control apparatus for a bacon slicing machine or the like having a rotary knife and hydraulic power means for advancing a slab of bacon or the like into said knife, said apparatus comprising a hydraulic pump to produce a given quantity of fluid for each rotation of said knife, a first hydraulic cylinder having a piston and a piston rod extending therefrom, a second hydraulic cylinder having a piston and a piston rod extending therefrom, a four-way valve having an actuating means including a first and a second actuating member positioned in the paths of the first and second piston rods respectively, said valve being connected to said pump and to said cylinders to deliver said quantities to said first cylinder and to drain said second cylinder for a first period until the first piston rod actuates said first actuating member and then to deliver said quantities to said second cylinder and to drain said first cylinder for a second period until the second piston rod actuates said second actuating member, said valve being connected to said power means to advance said slab toward said knife during said first period and to stop said slab during said second period.

9. A control apparatus for a bacon slicing machine or the like having a rotary knife and a hydraulic power means for advancing a slab of bacon or the like into said knife, said apparatus including a pump comprising a body member having a cylindrical chamber therein, a rotor formed about a cylindrical axis mounted in said chamber, a pumping cylinder in said rotor comprising an opening therethrough transverse to said axis, a piston in said cylinder, first and second passageways within said body member communicating with the ends of said cylinder at a position in the path of rotation of said cylinder, a source of fluid under pressure connected to said first passageway, and means to rotate said rotor in synchronism with said knife to produce a given quantity of fluid from said pump for each knife rotation, a first measuring means to count a predetermined number of said quantities, a second measuring means to count a given number of said quantities, sequencing means to alternately connect said second passageway to said first measuring means until the first means counts said predetermined number of quantities and to connect said second measuring means until said second means counts said given number of quantities, said measuring means being connected to said power means to advance said slab toward said knife when said count of said predetermined number is being made and to stop said slab when said count of said given number is being made.

References Cited in the file of this patent

UNITED STATES PATENTS

| | | |
|---|---|---|
| 1,861,734 | Bergmann | June 7, 1932 |
| 2,744,553 | Folk | May 8, 1956 |
| 2,787,972 | Vogt | Apr. 9, 1957 |